Aug. 25, 1964  R. G. PUCKETT  3,145,390
NEWSPAPER FOLDING, TYING AND THROWING MACHINE
Filed Dec. 10, 1962  6 Sheets-Sheet 1
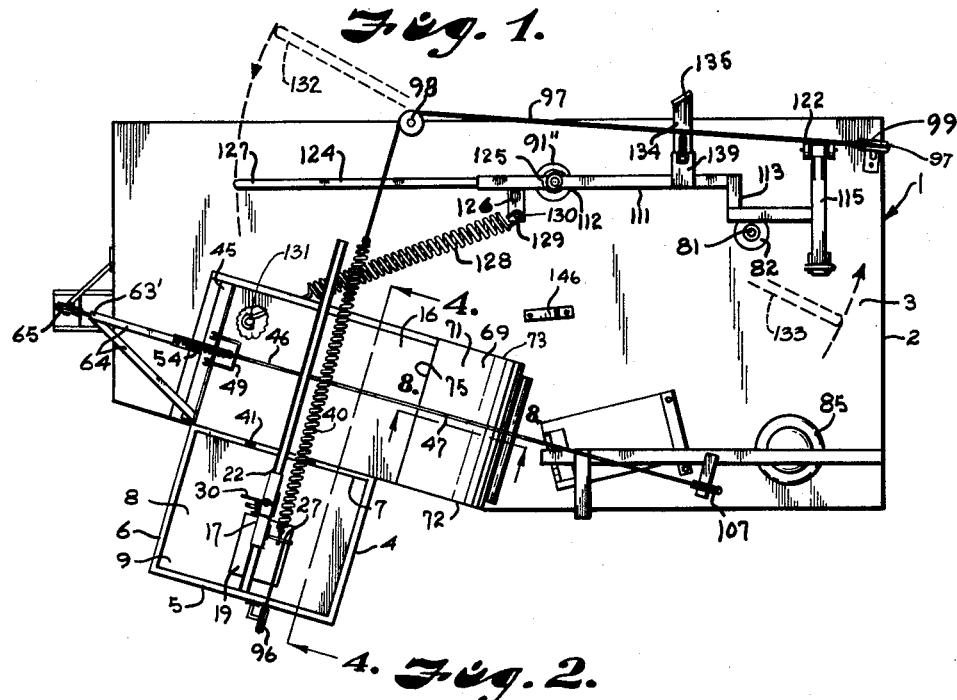
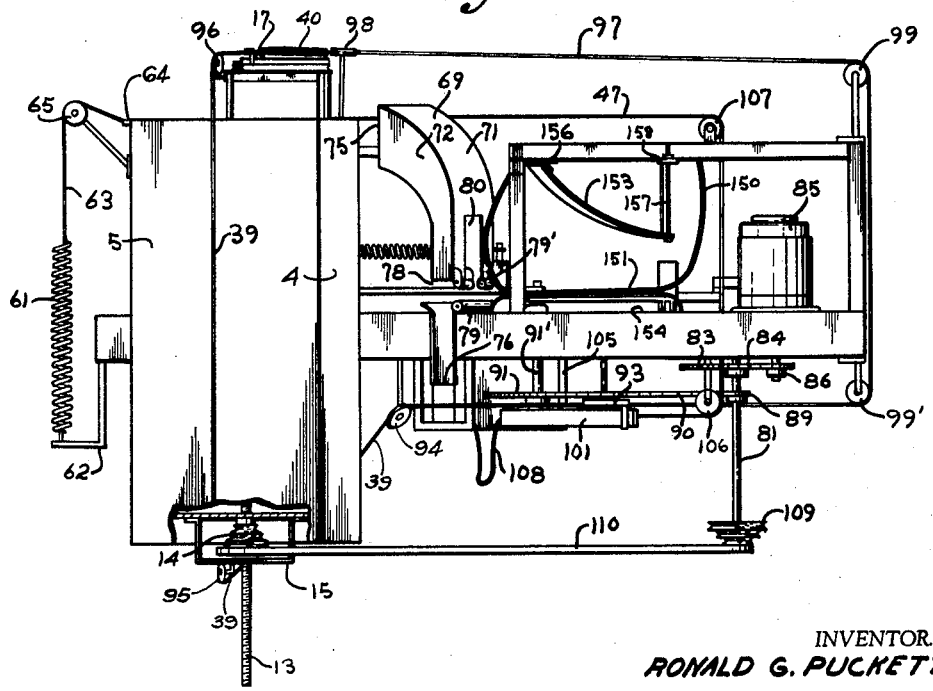
INVENTOR.
RONALD G. PUCKETT
BY
ATTORNEYS Aug. 25, 1964  R. G. PUCKETT  3,145,390
NEWSPAPER FOLDING, TYING AND THROWING MACHINE
Filed Dec. 10, 1962  6 Sheets-Sheet 2
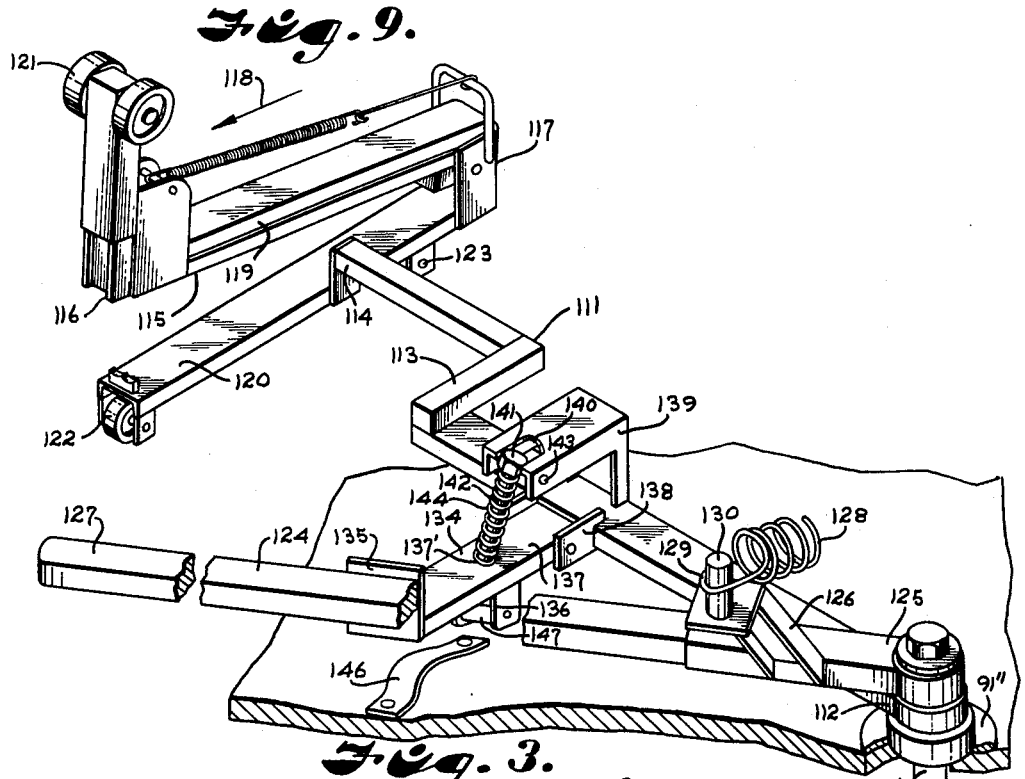
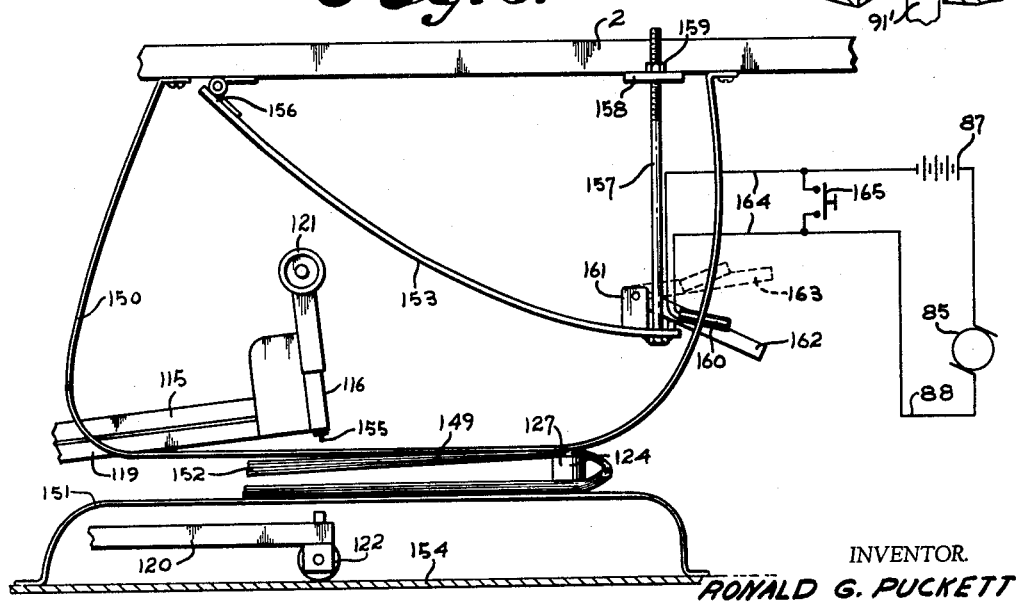
INVENTOR.
RONALD G. PUCKETT
BY
*Fishburn & Gold*
ATTORNEYS Aug. 25, 1964     R. G. PUCKETT     3,145,390
NEWSPAPER FOLDING, TYING AND THROWING MACHINE
Filed Dec. 10, 1962     6 Sheets-Sheet 3
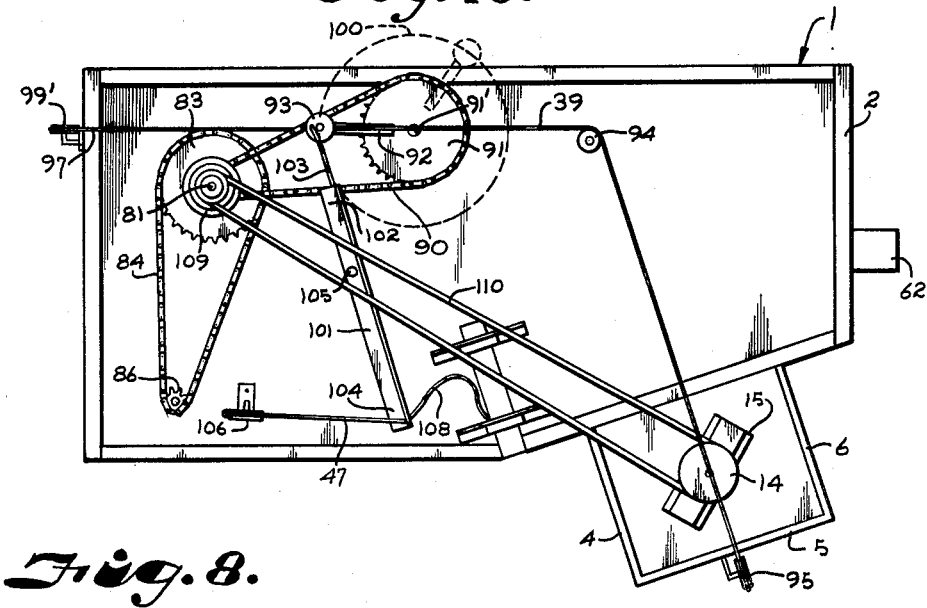
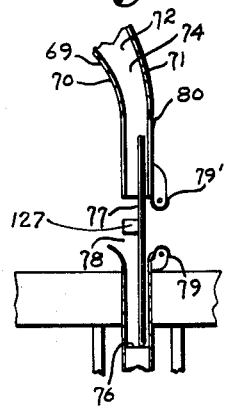
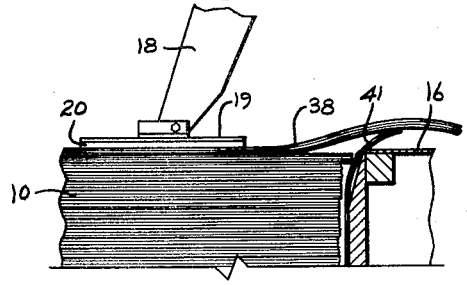
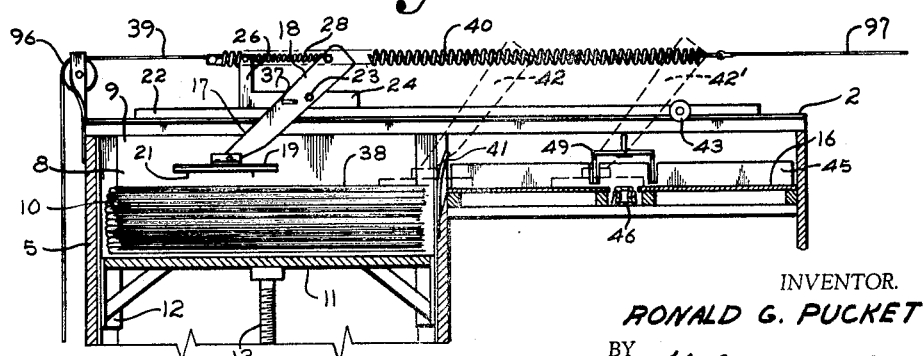
INVENTOR.
RONALD G. PUCKETT
BY
*Fishburn & Gold*
ATTORNEYS Aug. 25, 1964  R. G. PUCKETT  3,145,390
NEWSPAPER FOLDING, TYING AND THROWING MACHINE
Filed Dec. 10, 1962  6 Sheets-Sheet 4
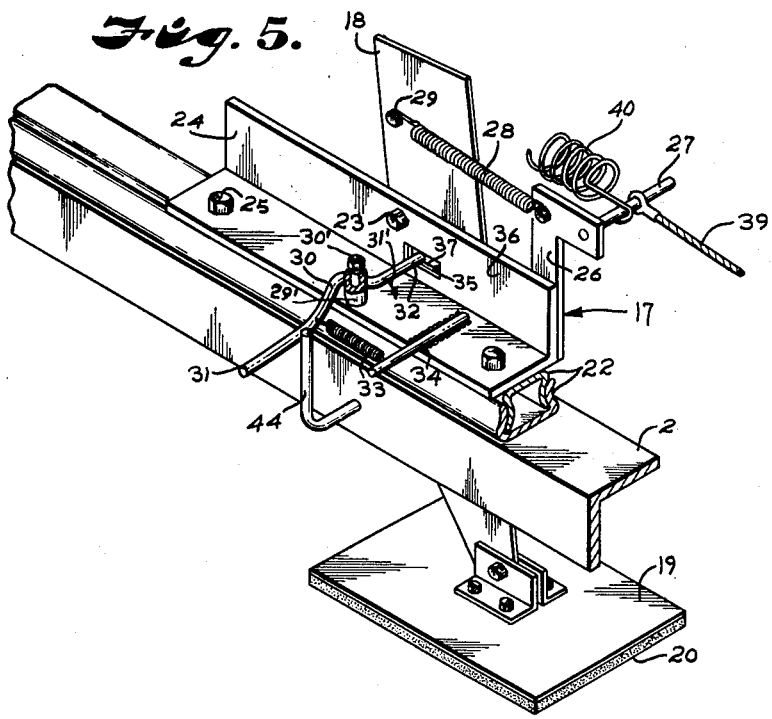
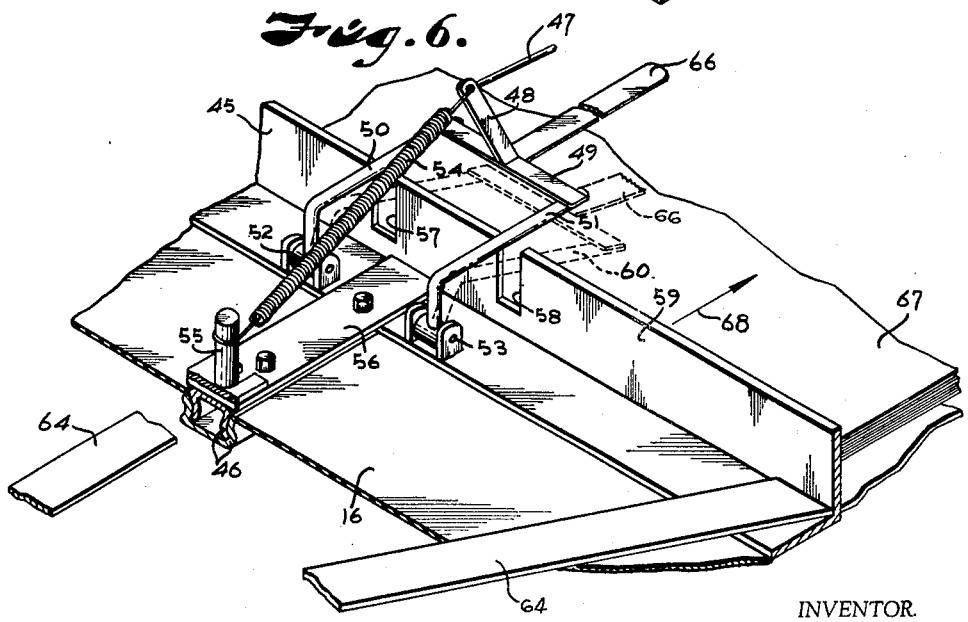
INVENTOR.
RONALD G. PUCKETT
BY
Fishburn & Gold
ATTORNEYS Aug. 25, 1964  R. G. PUCKETT  3,145,390
NEWSPAPER FOLDING, TYING AND THROWING MACHINE
Filed Dec. 10, 1962  6 Sheets-Sheet 5
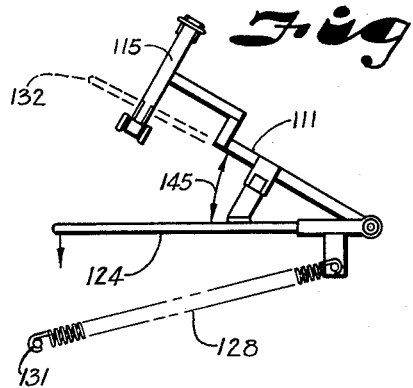
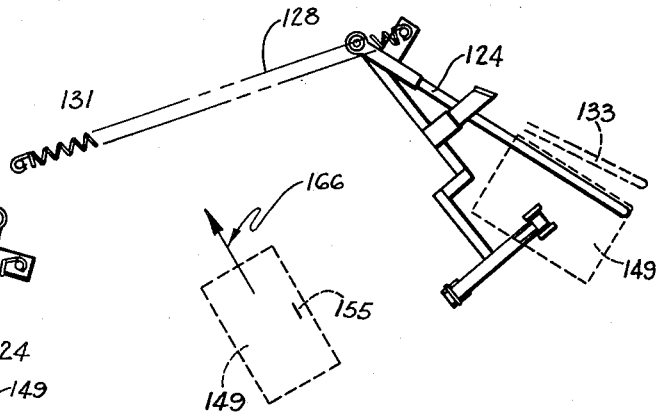
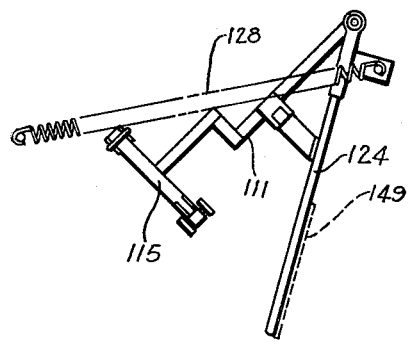
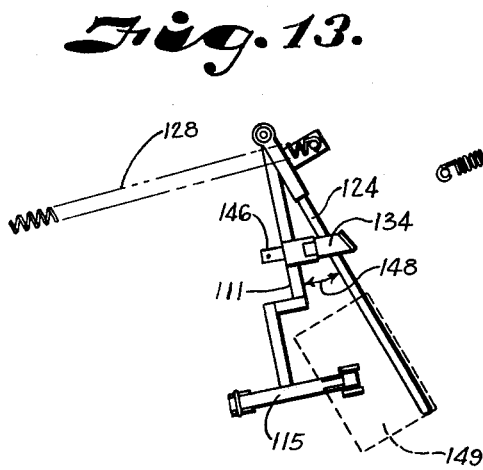
INVENTOR.
RONALD G. PUCKETT
BY
*Fishburn & Gold*
ATTORNEYS Aug. 25, 1964          R. G. PUCKETT                3,145,390
         NEWSPAPER FOLDING, TYING AND THROWING MACHINE
Filed Dec. 10, 1962                              6 Sheets-Sheet 6

INVENTOR.
RONALD G. PUCKETT
BY
Fishburn and Gold
ATTORNEYS

United States Patent Office 3,145,390
Patented Aug. 25, 1964

3,145,390
NEWSPAPER FOLDING, TYING AND
THROWING MACHINE
Ronald G. Puckett, 204 S. Troost, Olathe, Kans.
Filed Dec. 10, 1962, Ser. No. 243,305
10 Claims. (Cl. 1—107)

This invention relates to apparatus for the home delivery of newspapers, and more particularly to such a device which is adapted to fold, secure and throw newspapers from a rapidly moving motor vehicle.

Heretofore, many devices have been developed for folding and tying newspapers for home delivery. However, it has been necessary to throw the newspapers by hand, resulting in many problems, such as inaccuracy, insufficient delivery rate and inadequate distance of throw.

The principal objects of the present invention are: to provide apparatus adapted to be mounted on a newspaper delivery vehicle for automatically folding, securing and throwing newspapers or the like from the vehicle while rapidly moving; to provide such a device which is fast in operation, accurate in throwing and which can achieve long throwing distances; to provide such a device which may be operated with the unmodified electrical system of the delivery vehicle; to provide a newspaper throwing machine which uses centrifugal force developed by a pivoting arm for radially slinging a newspaper therefrom; to provide such a machine which automatically feeds newspapers into a position for folding about a pivotally moving arm, staples the newspaper in a folded condition about the arm, and subsequently radially slings the newspaper from the arm for delivery; and to provide such a device which is simple and rugged in construction, easily maintained in operation and well suited for its intended purpose.

Other objects and advantages of this invention will become apparent from the following description taken in connection with the accompanying drawings wherein are set forth by way of illustration and example certain embodiments of this invention.

FIG. 1 is a top view of apparatus embodying this invention particularly showing the relative positions of a feeder mechanism and newspaper throwing arm.

FIG. 2 is a front elevational view of the apparatus of FIG. 1 particularly showing the newspaper folding and stapling stations.

FIG. 3 is a fragmentary elevational view on an enlarged scale showing a newspaper traveling through the stapling station.

FIG. 4 is a fragmentary cross-sectional view on an enlarged scale taken on the line 4—4, FIG. 1, showing the apparatus newspaper feeding assembly.

FIG. 5 is a fragmentary perspective view on a scale enlarged over that of FIG. 4 showing a feeder member forming a part of the newspaper feeding assembly.

FIG. 6 is a fragmentary perspective view on a scale enlarged over that of FIG. 4 showing a newspaper pusher bar forming a part of the feeding assembly for urging a newspaper into position for folding.

FIG. 7 is a fragmentary elevational view on an enlarged scale showing the newspaper feeder member urging a newspaper onto a receiving platform.

FIG. 8 is a fragmentary elevational cross-sectional view on an enlarged scale taken on the line 8—8, FIG. 1 showing a funnel member adapted to receive a newspaper urged by the pusher bar and support same in a position for folding by a newspaper slinging arm.

FIG. 9 is a fragmentary perspective view on an enlarged scale showing a stapling mechanism-carrying driven pusher arm and a freely pivoted newspaper slinging arm mounted on a commoon shaft and rotating against a tension spring.

FIG. 10 is a plan view of the apparatus underside particularly showing the driving and synchronizing members therefor.

FIG. 11 is a fragmentary view showing the pusher arm and slinging arm in engaged position at the beginning of a cycle.

FIG. 12 is a fragmentary view showing the slinging arm rotated by the pusher arm to a position for contacting a newspaper in the funnel member.

FIG. 13 is a fragmentary view showing the slinging arm further rotated and the angle between the slinging arm and pusher arm reduced permitting the stapler mechanism to receive a newspaper thereinto.

FIG. 14 is a fragmentary view showing the slinging arm rotated to a location immediately upstream from top-dead-center position of the tension spring.

FIG. 15 is a fragmentary view showing the slinging arm immediately after a newspaper has been radially thrown therefrom under the force of the tension spring and prior to being overtaken by the driven pusher arm.

Figure 16:
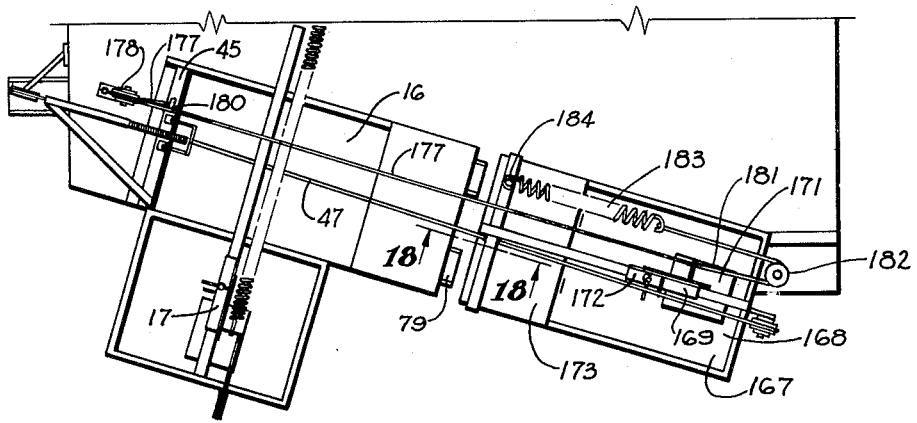
FIG. 16 is a top view of a modified apparatus embodying this invention which includes a wax paper support and feeder mechanism.

Referring to the drawings in more detail:

The reference numeral 1 indicates generally a newspaper folding, securing and throwing machine embodying this invention. The machine 1 includes a frame 2, in the illustrated example including a substantially horizontal table 3. Also included as a part of the frame 2 are vertically extending side walls 4, 5, 6 and 7 forming a vertically extending elongated newspaper stack-receiving hopper compartment 8 having an upper open end 9 for receiving a stack 10 of newspapers thereinto. A bottom wall 11 forms a part of the hopper compartment 8 for upwardly supporting the newspaper stack and suitable guide members 12 are located between the bottom wall 11 and respective side walls 4, 5, 6 and 7 to permit vertical movement of the bottom wall 11 longitudinally of the compartment 8. A threaded shaft 13 is secured to the bottom wall 11 and depends therefrom. A suitable variable speed or step pulley 14 has a threaded bore therethrough engaged with the threaded shaft 13 and is rotatably supported on a suitable support bracket 15 secured to the frame 2 for supporting the bottom wall 11 against downward displacement under the weight of the newspaper stack 10.

A platform 16 is supported by the frame 2 spaced laterally of and adjacent the compartment upper end 9 for receiving a single newspaper thereon, as described hereinafter. A feeder member 17 has an arm 18 terminating in a pivotally mounted feeder plate 19 having a downwardly disposed high friction surface 20 such as a rubber material for frictionally engaging a newspaper. Suitable needles or prongs 21 also depend from the feeder plate 19 to aid the high friction surface 20 in preventing relative movement or slipping between the feeder plate 19 and a newspaper. Relatively movable engaged slide members 22 are supported on the frame 2 and extend across and are spaced above the compartment upper end 9 and the platform 16 for reciprocally guiding the feeder member 17 therebetween in a manner described hereinafter. The arm 18 is pivotally mounted at 23 to an angular bracket 24 which is in turn secured to one of the slide members 22 by means of suitable bolts 25 for movement with respect to the frame 2. Also secured to the bracket 24 is a riser 26 having a stud 27 extending therefrom for anchoring motion-producing members later described. A tension spring 28 is secured at opposite ends thereof respectively to the riser 26 and the arm 18 at 29 for resiliently pivotally urging the arm 18 about the pivotal mount 23 which, due to the sloping angle of the arm 18, results in a lowering of the feeder plate 19 toward contact with the newspaper stack 10, FIG. 4. A lever arm 30 is fixed to a bushing 29′ which is pivotally mounted on an upstanding member 30′ intermediate the arm ends 31 and 32 thereof on the bracket 24 and is urged counterclockwise as illustrated in FIG. 5 by means of a tension spring 33 anchored to a stud 34 secured to the bracket 24, for example, by welding. The end 32 of the lever arm 33 extends, by pivoting about the member 30′, into a slot 35 formed in an upstanding leg 36 of the bracket 24 and is adapted to extend past the slot 35 into a matching alignable slot 37 in the arm 18 when the later slot is in alignment with the slot 35. When the slots 37 and 35 are aligned and the lever arm end 32 extends through the slot 35 into the slot 37, the arm 18 is locked by interference of the arm 30 with the arm 18 in a position which maintains the feeder plate 19 spaced above the newspaper stack 10. When, however, the lever arm 30 is pivoted about the member 30′ in the direction indicated at 31′ so that the end 32 thereof is withdrawn from the slot 37, the tension spring 28 causes the arm 18 to pivot so that the feeder plate 19 contacts the top newspaper 38 of the stack 10 for feeding onto the platform 16, FIG. 7.

In operation of the feeder member 17, a cable 39, longitudinally reciprocated by structure described hereinafter, is anchored to the stud 27 and a tension spring 40 is also anchored to the stud 27. The cable 39 and tension spring 40 pull in opposite directions along the path of the slide members 22 for reciprocating the feeder member 17 between the hopper compartment upper end 9 and the platform 16. Assuming that the feeder member 17 is being driven toward the platform 16 and is engaged with the top newspaper 38, the path of travel thereof causes the newspaper 38 to be urged against and across resilient upstanding fingers 41 to insure the passage of a single newspaper, and the newspaper is deposited on the platform 16. During the path of travel of the feeder member 17, the feeder plate 19 also rides between the fingers 41 as indicated by the position of the dotted lines at 42 and the feeder member 17 continues until it reaches the position indicated by the dotted lines at 42′. At 42′ the depending arm 18 contacts a stationary roller 43 mounted on the frame 2 and the contact results in a pivoting of the arm 18 to a position where the lever arm end 32 enters the slot 37 locking the feeder plate 19 above the surface of the platform 16 and newspaper stack 10. Upon the return stroke of the feeder member 17, the feeder plate 19 maintains this elevated position until it is again in a desired position above the newspaper stack 10 whereupon the end 31 of the lever arm 30 strikes a stop member 44 (FIG. 5) secured to the frame 2 which causes the lever arm 30 to pivot and again release the arm 18 for dropping the feeder plate 19.

A newspaper pusher bar 45 is located on the platform 16 normally out of the path of the feeder member 17 but mounted on relatively slidable guide members 46 supported on the frame 2 and adapted to reciprocally guide the pusher bar 45 across the platform 16 transversely of the feed travel direction of the feeder member 17. The pusher bar is reciprocated by means of a cable 47 through motive members described hereinafter. The cable 47 is secured to an upstanding arm 48 of a yoke 49 having parallel rearwardly extending and downwardly curving legs 50 and 51 pivotally secured to the pusher bar 45 at 52 and 53. The yoke 49 is normally resiliently maintained in a raised position by a coil spring 54 secured at one end thereof to the upstanding arm 48 and at the other end thereof anchored to a pin 55 fixed to an extension 56 of the pusher bar 45. Vertically extending upwardly open slots 57 and 58 are formed in a vertical leg 59 of the pusher bar 45 and are respectively adapted to receive the legs 50 and 51 when the yoke 49 is tilted downwardly against the pull of the coil spring 54 by the cable 47. The pusher bar 45 is resiliently restrained in its travel across the platform 16 to induce the elongation of the coil spring 54 and tilting of the yoke 49 to the positions indicated by the dotted lines at 60. The restraining apparatus for the pusher bar 45 comprises an elongated coil tension spring 61 secured at one end thereof to a bracket 62 fixed to the frame 2 and at the other end thereof to a cable 63 which is secured to the apex 63′ of a pair of engaged stabilizing struts 64 secured to the pusher bar 45. The cable 63 is guided from a vertical to a generally horizontal direction by extending same over a suitable pulley 65 to obtain the desired direction of pull in a minimum space.

Extending forwardly from the yoke 49 is a resilient finger 66 which bears downwardly upon the platform 16 as the pusher bar 45 moves thereacross under the pull of the cable 47. The finger 66 acts as a resilient holddown for preventing transverse collapse of a newspaper designated 67 during the pushing thereof in the direction indicated by the arrow 68.

A funnel member 69 is supported on the frame 2 and has front and rear walls 70 and 71 and end walls 72 and 73 forming a passageway 74 having a horizontally open mouth 75 located adjacent the platform 16 for receiving a newspaper therefrom urged by the pusher bar 45. The passageway 74 curves downwardly from the mouth 75 and terminates in a stop 76 for supporting a newspaper designated 77 in a vertically extending position. Aligned slots 78 extend horizontally across and interrupt the funnel member walls at positions spaced approximately one half the height of the newspaper 77 which is shown supported in the funnel member passageway 74 against the stop 76. A suitable lower roller member 79 is rotatably secured to the rear wall 71 adjacent the rear wall slot. Upwardly extending cut-outs 80 are formed in the walls 70 and 71 and communicate with the slots 78 thereof for reasons which will become apparent hereinafter. Upper rollers 79′ are located adjacent the slot of the rear wall 71 and on opposite sides of the cut-out 80 in the rear wall 71.

A vertically extending shaft 81 is rotatably mounted in a suitable bearing 82 secured to the frame 2. A first sprocket wheel 83 is fixed to the shaft 81 and has a chain 84 engaged therewith. A motor 85 preferably of the low voltage, high current D.C. type suitable for receiving power from the usual automotive vehicle electrical system is fixed on the frame 2 and terminates in a sprocket pinion 86 also engaged with the chain 84 for rotating the sprocket wheel 83. A suitable source of power, preferably an automotive vehicle battery schematically designated 87 and maintained in a charged condition by the usual automotive generator (not shown) is connected to the motor 85 by conventional electrical cables 88. A sprocket pinion 89 is fixed to the shaft 81 and has a chain 90 engaged therewith. A second sprocket wheel 91 is rotatably mounted by means of a vertical shaft 91′ supported in a bearing 91″ on the frame 2 spaced from the funnel members 69 and is engaged with the chain 90. A radially extending arm 92 is fixed to the sprocket wheel 91 and is rotatable therewith. A cable anchor and cam member 93 is fixed to the outer end of the arm 92 to which is pivotally anchored the cable 39 which induces the return of the feeder member 17 described above. The cable 39 passes over pulleys 94, 95 and 96 and extends between the member 93 and the feeder member stud 27.

The spring 40 which is anchored at one end thereof to the stud 27 is anchored at the other end thereof to a cable 97 which extends over pulleys 98, 99 and 99′ and is anchored to the member 93 but extending in the opposite direction therefrom than that of the cable 39. Thus a closed circuit to the member 93 from the feeder member stud 27 is formed whereby the feeder member 17 may be reciprocated on the slide member 22 in response to the arc 100 traversed by the cam member 93 during rotation of the sprocket wheel 91. It is to be understood that the tension spring 40 maintains the cables 39 and 96 taut while permitting resiliency to avoid damage in case of a jamming in the motion of the feeder member 17. It is further noted that due to the non-slipping characteristics of the chain 90, the longitudinal reciprocation imparted to the cables 39 and 96 for operating the feeder member 17 is always in synchronization with the rotation of the vertically extending shaft 81.

A lever arm 101 has a first end 102 with a cam follower finger 103 extending therefrom and a second oppositely extending end 104. The lever 101 is pivotally secured at 105 to the frame 2 intermediate the ends 102 and 104 and the cam follower finger 103 is located in the path or arc 100 traversed by the member 93. The member 93 contacts the finger 103 to produce a rocking of the lever arm 101 in synchronization with the rotation of the first sprocket wheel 83. The end 104 of the lever arm 101 has the pusher bar cable 47 anchored thereto which extends over pulleys 106 and 107 to obtain the correct direction of pull for the pusher bar 45. Suitable resilient bias is maintained on the cable 47 for return pivoting of the lever arm 101 by the spring 61 acting through the cable 63 secured to the pusher bar struts 64. A tail cable 108 is anchored at opposite ends thereof to the lever arm end 104 and the frame 2 to prevent the lever arm 101 from pivoting through an excessive arc on its return stroke. It is to be understood that the reciprocal pivoting of the lever arm 101 produces the traverse or reciprocation of the pusher bar 45 in timed out-of-phase relation with the traverse or reciprocation of the feeder member 17 whereby a newspaper is first deposited upon the platform 16 by the feeder member 17 and the pusher bar 45 urges the newspaper into the funnel mouth 75 after a pathway therefor has been cleared by the return stroke of the feeder member 17.

The shaft 81 has a variable speed or step pulley 109 fixed thereto and a drive belt 110 is engaged therewith and with the threaded pulley 14 for raising the bottom wall 11, and therefore the paper stack 10 in the hopper compartment 8, in synchronization with the rotation of the first sprocket wheel 83. The drive belt 110 is adjusted to the various steps of the sprockets 109 and 14 in order to compensate for the day to day variations in individual newspaper thickness.

A horizontally extending first or pusher arm designated 111 is fixed at one end 112 thereof to the shaft 91' and is therefore rotatable with the sprocket wheel 91. The pusher arm 111 has a circumferentially rearwardly extending jog 113 and terminates at the outer end 114 thereof in a stapler mechanism 115. The stapler mechanism 115 has a forward end 116 and a rear end 117 and is supported by the pusher arm 111 transversely thereof so as to describe a circumferential path in the direction indicated by the arrow at 118 with the front and rear ends 116 and 117 respectively in circumferential alignment. The stapler mechanism 115 has upper and lower elongated jaw members respectively designated 119 and 120 which are hinged together at the rear end 117 and normally spaced apart at the forward end 116. The jaw members at the forward end 116 have suitable cam follower rollers respectively designated 121 and 122 for a purpose later described. A roller 123 is pivotally mounted to the lower jaw member 120 and depends therefrom adjacent the rear end 117 to help support the stapler mechanism 115 on a path over the upper surface of the table 3.

A second or slinging arm 124 has an inner end 125 freely pivotally mounted on the shaft 91' adjacent the pusher arm end 112 to support the slinging arm 124 for independent rotation. A circumferentially forwardly offset bracket 126 is fixed to and extends laterally from the slinging arm 124 spaced from the shaft 91'. The slinging arm 124 terminates in a smooth outer or newspaper handling end 127. An elongated resilient tension spring 128 has one end 129 thereof pivotally anchored to an upstanding pin 130 fixed to the offset bracket 126 and the other end 131 thereof anchored to the frame 2 for resiliently urging the slinging arm 124 toward a rotational rest position indicated by the dotted lines at 132 and away from a top-dead-center position indicated by the dotted lines at 133.

A push latch 134 is mounted on the arm 111 and has a forward push member 135 and a rear push member 136 spaced apart circumferentially about the shaft 91' and both leading the arm 111. The forward and rear push member 135 and 136 extend from a bar 137 which is pivotally mounted between ears 138 fixed to the pusher arm 111 for pivoting in a vertical plane. A right angle bracket 139 is fixed to the pusher arm 111 and is bifurcated at 140 for receiving a pivotally supporting the head 141 of a guide member 142 by means of a transverse pin 143. The guide member 142 at the other end thereof extends slidably through the bar 137 at 137'. A helical compression spring 144 surrounds the guide member 142 and bears respectively against the bar 137 and the bracket 139 resiliently urging the forward push member 135 downwardly into a position for contacting the slinging arm 124 for rotating same with the arm 111 out of the rest position 132 against the force of the tension spring 128. It is noted that when the forward push member 135 is contacting the slinging arm 124 a lead angle indicated by the double arrow at 145 exists between the two arms (FIG. 11).

An actuating cam bar 146 is fixed with respect to the frame 2 on the table 3 in the path of the push latch 134 and is adapted to contact a roller 147 associated with the rear push member 136 to cause the bar 137 to pivot upwardly against the compression spring 144 and disengage the forward push member 135 from the slinging arm 124. Upon the raising of the bar 137 by the cam bar 146 the rear push member 136 is presented to the slinging arm 124 and the tension on the spring 128 causes the angle between the arms to be reduced until the slinging arm contacts the rear push member 136, presenting a new lead angle indicated by the double arrow at 148 (FIG. 13).

The stapler mechanism 115 and the slinging arm outer end 127, during rotation of the shaft 91' travel in an aligned path through the funnel member slots 78 and passageway 74, the stapler mechanism clearing through the cut-outs 80. When passing through the passageway 74, the slinging arm outer end 127 contacts and folds a newspaper designated 149 therearound aided by the rollers 79 and 79', FIG. 8. The cam bar 146 is located downstream from the funnel member 69 for operating the push latch 134 after the slinging arm outer end 127 has passed through the slots 78.

Upper and lower resilient guide wires or members 150 and 151 respectively are secured to the frame 2 and are located downstream from the funnel member 69 and operatively adjacent the cam bar 146 for maintaining the newspaper 149 in a folded condition therebetween around the slinging arm 124 during the disengagement of the forward push member 135. This latter disengagement, as noted above, reduces the lead angle between the slinging arm 124 and the pusher arm 111 permitting the stapler mechanism 115 to advance to a position where the forward end 116 thereof extends past the rear edge 152 of the newspaper 149 (FIG. 3).

Upper and lower cam plates 153 and 154 are secured to the frame 2 operatively adjacent the resilient guide members 150 and 151 and together present inwardly tapered surfaces in the path of the stapler mechanism cam follower rollers 121 and 122, urging the stapler mechanism jaws together for actuating same to insert a staple 155 in the paper 149 maintaining same in a secured folded condition about the slinging arm 124. It is noted that the upper cam plate 153 is hinged at the rear end 156 thereof and adjustably supported by depending rods 157 at the front end thereof. The rods 157 are threadedly engaged in ears 158 and lock nuts 159 lock same in a desirable longitudinal position to compensate for variations in the day to day thickness of the newspapers.

A normally closed switch 160 is preferably of the mercury closure type sensitive to tilting to initiate the operation thereof. The switch 160 is pivotally mounted on a lug 161 fixed to the rear end of the upper cam plate 153 and has an actuating arm 162 located immediately downstream from the cam plates 153 and 154 and in the path of the stapler mechanism whereby the stapler mechanism causes the switch to assume the pivoted position as indicated by the dotted lines 163, opening the normally closed switch. The switch 160 is operatively connected by means of electrical wires 164 in series with the battery 87 and motor 85 to produce a de-energizing and stopping of the motor after the actuation of the stapler mechanism and with the arm 124 immediately upstream from the top-dead-center position indicated at 133.

A push button switch 165 is connected in parallel with the switch 160 across the wires 164 for selectively electrically bypassing the switch 160. Actuating the switch 165 energizes the motor 85 for pushing the slinging arm 124 past the top-dead-center position 133 and thereby releasing the slinging arm for rapid free rotation by the spring 128 toward the rest position 132. The slinging arm 124 is radially and circumferentially unobstructed by the frame 2 or parts thereon in the path of said rapid free rotation and the newspaper 149 is thus slung or thrown radially from the outer end 127. The pusher arm 111 lags far behind the arm 124 during the free rotation thereof but rapidly follows in the same direction and overtakes the arm 124 in rest position causing the forward push member 135 to engage for repeating the cycle.

In summary of the operation, a newspaper is fed by the feeder member 17 on to the platform 16. The pusher bar 45 pushes the newspaper into the funnel member 69 where it comes to rest against the stop 76 in the passageway 74. During the above feeding operation the pusher arm 111 has contacted the slinging arm 124 as indicated in FIG. 11 and pushes the latter against the tension of the spring 128 toward the funnel member 69 where the arm 124 contacts and folds the newspaper designated 149 (FIG. 12). Following the folding of the newspaper, the lead angle between the arms 128 and 111 is reduced by actuation of the push latch 134 permitting the stapler mechanism 115 to receive the newspaper 149 thereinto (FIG. 13) and a staple inserted for securing the newspaper in folded position. The switch 160 is then actuated which de-energizes the driving motor 85, stopping the slinging arm 128 immediately prior to reaching the top-dead-center 133 of the spring 128 (FIG. 14). Upon pressing the pushbutton 165, the slinging arm 128 is pushed past the top-dead-center position 133 and rapidly accelerates under the force of the spring 128 causing the newspaper 149 to be thrown radially from the slinging arm end 127 generally in the direction indicated by the arrow at 166. It is noted that in normal operation the machine above described completes a cycle in approximately one second which permits a delivery vehicle to be driven as fast as 30 miles per hour through most crowded residential districts. It is estimated that approximately one-quarter of a second is required between the time the pushbutton 165 is depressed and the slinging arm is in its free path for throwing the paper. If desired, the entire machine may be tilted for varying the angle of throw or aiding the feeding of the newspapers from the stack. Also, the tension of the spring 128 may be varied by any suitable adjusting means to vary the force imparted to the slinging arm during free rotation thereof. It is contemplated that two machines will be supported on a delivery truck and operated simultaneously for delivering papers to customers on both sides of the street.

Figure 17:
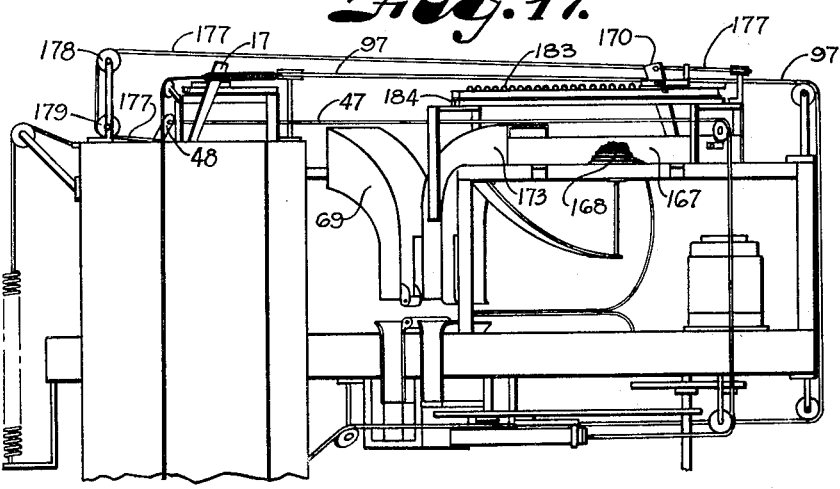
FIG. 17 is a front elevational view of the modified apparatus of FIG. 16.
Figure 18:
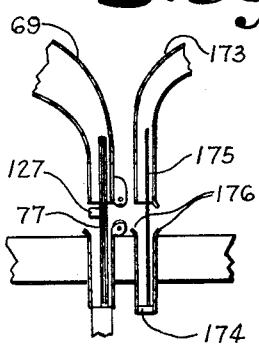
FIG. 18 is a fragmentary elevational cross-sectional view taken on the line 18—18, FIG. 16, showing a wax paper receiving funnel member adjacent the newspaper funnel member and adapted to receive and support a wax paper sheet urged thereinto by a pusher bar for folding about the newspaper.

Referring to FIGS. 16, 17 and 18, a modified form of this apparatus is illustrated which is similar to that described above except for the addition of a wax paper handling mechanism operable to cause wax paper to be wrapped around the newspaper for delivery in inclement weather. A platform 167 similar to the platform 16 described above is supported by the frame and spaced longitudinally adjacent the platform 16 for receiving a stack of wax paper sheets 168. A feeder member 169 similar to the feeder member 17 described above has a depending arm 170 terminating in a pivotally mounted feeder plate 171. Suitable slide members 172 are supported on the frame and are spaced above the platform 167 for reciprocally guiding the feeder member 169 toward a funnel member 173 which curves downwardly and terminates adjacent the funnel member 69. The funnel member 173 has a stop 174 for supporting a sheet of wax paper 175 in a vertically extending position as illustrated in FIG. 18. The funnel member 173 has aligned slots 176 extending horizontally across and interrupting the walls of the funnel member 173 at positions aligned with the slots 78 of the funnel member 69.

The feeder member 169 is secured to one end of a cable 177 which extends over pulleys 178 and 179 and is anchored at 180 to the pusher bar 45. Another cable 181 is secured at one end thereof to the feeder member 169, extends over a pulley 182 and ties to one end of a tension spring 183. The tension spring 183 anchors at the other end thereof to the funnel member 173 at 184.

In operation, as the pusher bar 45 urges a newspaper into the funnel member 69, tension is applied to the cable 177 which operates the feeder member 169 in a manner similar to the feeder member 17 above described. The feeder member 169 urges a sheet of wax paper into the funnel member 173. The wax paper drops downwardly against the stop 174 as indicated in FIG. 18 and upon the return stroke of the pusher bar 45 the tension spring 183 causes the feeder member 169 to reciprocate to its original position for picking up the next wax paper sheet. As the arm end 127 passes through the funnel member 69, a newspaper is wrapped therearound as described above. The arm end 127 also passes through the funnel member 173 wrapping the wax paper sheet 175 around the exterior of the newspaper. The stapling mechanism then urges a staple through the wax paper and newspaper, securing the latter therearound for protecting the exterior of the newspaper from the effects of wet grass, rain and the like. The wax paper sheet does not interfere with the throwing arm, and the operation thereof after picking up the wax paper sheet is as above described.

It is to be understood that while certain forms of this invention have been illustrated and described, it is not to be limited to the specific forms or arrangements of parts herein described and shown except insofar as such limitations are included in the claims.

What I claim and desire to secure by Letters Patent is:
1. A device for throwing newspaper and the like comprising:
   (a) a frame, support means rotatably mounted on said frame, drive means for selectively rotating said support means in a forward direction,
   (b) a first member operatively fixed to said support means and rotatable therewith,
   (c) a second member having an inner end and an outer end, means for supporting said second member at said inner end thereof for free pivotal motion about said support means,
   (d) a resilient member operatively connected between said frame and said second member for resiliently urging said second member outer end toward a cir- cumferential rest position and away from a circumferential top-dead-center position, (e) engaging means operatively located between and movable with said first and second members for rotating said second member outer end with said first member out of said rest position against the force of said resilient member and through a circumferential path, said engaging means being constructed to provide disengagement between said first and second members upon forward rotation of said second member with respect to said first member, and (f) means on said frame and located in said path for feeding a foldable newspaper and the like into said path for engagement about and movement with said second member outer end through said top-dead-center position, (g) whereby when said second member outer end passes said top-dead-center position said resilient member induces a rapid free rotation of said second member outer end toward said rest position whereupon the newspaper is centrifugally urged radially from said outer end.

2. The device of claim 1 including:
(a) means on said frame for securing the newspaper in a folded condition about said second member outer end prior to said second member reaching said top-dead-center position.

3. The device of claim 1 wherein:
(a) said first and second members are respectively elongated arms, and
(b) said first member has a stapling apparatus secured thereto for securing the newspaper in a folded condition about said second member.

4. The device of claim 1 wherein said resilient member is an elongated tension spring.

5. The device of claim 1 including:
(a) means for de-energizing said drive means when said second member outer end is immediately upstream on said path from said top-dead-center position, and
(b) means for selectively overriding said de-energizing means for urging said member outer end past said top-dead-center position.

6. A newspaper feeder comprising:
(a) a frame, sidewalls on said frame forming a newspaper stack receiving hopper compartment with an upper end having an open top, a bottom wall in said compartment for supporting the newspaper stack, guide members between said bottom wall and side walls permitting movement of said bottom wall longitudinally of said compartment, advancing means engaged with said bottom wall and said frame for raising said stack,
(b) a single newspaper receiving horizontal platform supported on said frame and spaced laterally of and adjacent said compartment upper end, a feeder member having a depending arm terminating in a feeder plate having a downwardly disposed high friction surface for selectively frictionally engaging a newspaper on the stack, a slide member supported on said frame and extending across and spaced above said compartment upper end and said platform for reciprocally guiding said feeder member therebetween, means associated with said feeder member for moving said arm and feeder plate between a newspaper engaging position and a non-engaging return position,
(c) a pusher bar on said platform, guide members supported on said frame and adapted to reciprocally guide said pusher bar across said platform transversely of the feed travel direction of said feeder member, drive means for driving said advancing means and alternately reciprocating said feeder member and pusher bar, and
(d) a funnel member on said frame and having means forming a passageway with an open mouth located adjacent said platform for receiving a newspaper therefrom urged by said pusher bar.

7. The device of claim 1 wherein said feeding means comprises:
(a) front and rear walls supported on said frame and forming a funnel member having a mouth for receiving a newspaper, said walls forming a passageway extending downwardly from said mouth and terminating in a stop for supporting a newspaper in a generally vertically extending position,
(b) transversely aligned slots extending horizontally across and interrupting said walls at positions spaced approximately one half the height of a newspaper supported in said funnel member passageway,
(c) said aligned slots being located in said path whereby said second member outer end passes transversely through said passageway for engaging and folding a newspaper therearound.

8. In a newspaper throwing device:
(a) a frame, a vertical shaft rotatably mounted on said frame, means for rotating said shaft in a direction, a horizontally extending first arm fixed to said shaft and rotatable therewith,
(b) a stapler mechanism having a forward end and a rear end, said stapler mechanism having upper and lower elongated jaw members hinged together at said stapler mechanism rear end and normally spaced apart at said stapler mechanism forward end, said jaw members having cam follower rollers at said forward end, said stapler mechanism being fixed to said first arm and rotatable therewith in a circumferential path with said stapler mechanism forward end leading,
(c) a second arm having an inner end and an outer end, said second arm being freely pivotally supported at said inner end thereof on said shaft for free independent rotation thereabout, a bracket fixed to said second arm and spaced from said second shaft,
(d) an elongated resilient tension spring having one end thereof pivotally anchored to said bracket and the other end anchored to said frame for resiliently urging said second arm toward a circumferential rest position and away from a circumferential top-dead-center position,
(e) a push latch mounted on said first arm and having forward and rear push members respectively spaced apart circumferentially about said shaft and leading said first arm, said push latch being adapted to engage said second arm with said forward push member for rotating said second arm with said first arm out of said second arm rest position against the force of said tension spring and with said second arm leading said first arm by a first lead angle, a cam bar fixed to said frame in the path of said push latch and adapted to contact said push latch to cause same to disengage said forward push member from said second arm and present said rear push member to said second arm allowing said tension spring to reduce said first lead angle to a smaller second lead angle, said stapler mechanism trailing said second arm outer end,
(f) means for feeding a newspaper in folded condition about said second arm outer end with the edges of the newspaper trailing said second arm outer end, said cam bar being located downstream from said feeding means, said second lead angle permitting the newspaper trailing edges to enter into said stapler mechanism forward end, and
(g) upper and lower cam plates secured to said frame downstream from said cam bar and in the path of said stapler mechanism cam follower rollers for urging said stapler mechanism jaws together and actuating said stapler mechanism to staple the newspaper in a folded condition around said second outer end.

9. A newspaper throwing machine for use on a newspaper delivery vehicle comprising:
   (a) a frame, means on said frame forming a newspaper stack receiving hopper compartment,
   (b) a feeder assembly on said frame and adapted to engage a newspaper in said compartment and deliver same to a pick-up position,
   (c) an arm having an inner end and an outer end, said arm being freely pivotally supported at said inner end thereof on said frame for independent rotation in a forward circumferential path through said pick-up position, a resilient member operatively secured between said frame and said arm for resiliently urging said arm toward a circumferential rest position and away from a circumferential top-dead-center position,
   (d) driven means on said frame for engaging and circumferentially pivoting said arm against the force of said resilient member in said forward circumferential path, said driven means being adapted to disengage from said arm upon forward motion of said arm with respect to said driven means, and
   (e) means for synchronizing the operation of said feeder assembly with said driven means whereby said arm picks up a newspaper and radially urges same therefrom downstream from said top-dead-center position.

10. The machine as set forth in claim 9 including:
   (a) a second feeder assembly on said frame, means for synchronizing the operation of said second feeder assembly with said first-named feeder assembly, said second feeder assembly being adapted to engage a sheet of wax paper and deliver same to a wax paper sheet pick-up position downstream from said newspaper pick-up position,
   (b) whereby said arm rotates through said wax paper pick-up position after picking up a newspaper for wrapping a wax paper sheet about the newspaper.

No references cited.